United States Patent
Liermann et al.

(10) Patent No.: US 9,033,128 B2
(45) Date of Patent: May 19, 2015

(54) FRICTION RING

(71) Applicant: düspohl Maschinenbau GmbH, Schloss Holte-Stukenbrock (DE)

(72) Inventors: Nadine Liermann, Bad Oeynhausen (DE); Uwe Wagner, Gütersloh (DE)

(73) Assignee: düspohl Maschinenbau GmbH, Schloss Holte-Stukenbrock (DE)

( * ) Notice: Subject to any disclaimer, the term of this patent is extended or adjusted under 35 U.S.C. 154(b) by 74 days.

(21) Appl. No.: 13/923,700

(22) Filed: Jun. 21, 2013

(65) Prior Publication Data

US 2014/0001006 A1 Jan. 2, 2014

(30) Foreign Application Priority Data

Jun. 28, 2012 (DE) ...................... 20 2012 102 400 U

(51) Int. Cl.
*F16D 13/68* (2006.01)
*B65H 75/24* (2006.01)

(52) U.S. Cl.
CPC .............. *F16D 13/68* (2013.01); *B65H 75/245* (2013.01)

(58) Field of Classification Search
CPC ......... F16D 13/60; F16D 11/16; F16D 13/06; F16D 13/14; F16D 41/18; F16D 41/069; F16D 47/04
USPC ........................................... 192/107 T, 85.12
See application file for complete search history.

(56) References Cited

U.S. PATENT DOCUMENTS

| | | | | |
|---|---|---|---|---|
| 2,705,428 A | * | 4/1955 | McCullough | 74/575 |
| 2,740,511 A | * | 4/1956 | Barnes | 192/41 A |
| 3,038,679 A | | 6/1962 | Pospiszel | |
| 3,285,528 A | | 11/1966 | Beindorf | |
| 3,923,132 A | * | 12/1975 | van der Klugt | 192/45.1 |
| 3,946,843 A | * | 3/1976 | Downs | 192/45.1 |
| 5,088,581 A | * | 2/1992 | Duve | 192/46 |
| 5,451,010 A | | 9/1995 | Heuser | |
| 6,589,121 B1 | * | 7/2003 | Leonard | 464/37 |
| 6,749,147 B2 | | 6/2004 | Heuser | |

FOREIGN PATENT DOCUMENTS

| | | |
|---|---|---|
| BE | 707874 A | 4/1968 |
| CH | 475150 | 8/1969 |
| DE | 2856066 A1 | 7/1980 |
| DE | 3918863 A1 | 12/1990 |
| DE | 4116940 A1 | 11/1992 |
| DE | 9422013 U1 | 9/1997 |
| DE | 202010000100 U1 | 4/2011 |
| EP | 0603636 B1 | 12/1993 |
| EP | 1316524 B1 | 11/2001 |
| WO | 2007/143337 A1 | 12/2007 |

* cited by examiner

*Primary Examiner* — Rodney H Bonck
(74) *Attorney, Agent, or Firm* — Richard M. Goldberg

(57) ABSTRACT

A friction ring (12) for reel shafts (10), having on its inner periphery a friction surface (22) for frictional engagement with the reel shaft (10), and on its outer periphery a plurality of radially projecting leaf springs (24) that are inclined relative to the radial direction in a uniform direction (D) of rotation, each leaf spring having a base portion (26) held in a slot (28) of the friction ring (12), wherein each leaf spring (24) is adapted to be bent back into a recess (30) of the friction ring (12) on the side facing forward in the direction (D) of rotation and is supported on a wall (32) of this recess on the opposite side.

5 Claims, 2 Drawing Sheets

FRICTION RING

BACKGROUND OF THE INVENTION

The invention relates to a friction ring for reel shafts, having on its inner periphery a friction surface for frictional engagement with the reel shaft, and on its outer periphery a plurality of radially projecting leaf springs that are inclined relative to the radial direction in a uniform direction of rotation, each leaf spring having a base portion held in a slot of the friction ring.

Such friction rings are used in particular in longitudinal cutting and reeling apparatus in which a web of a material that is capable of being reeled is divided into a plurality of narrow strips in longitudinal direction and each strip is then wound onto a respective hub. Typically, a plurality of hubs are mounted on a common reel shaft. The friction rings serve for transmitting the torque of the reel shaft frictionally onto the hubs, so that differences in reeling speed that may be caused by minor differences in the diameters of the coils formed on the different hubs may be compensated by slippage of the friction rings and hence the hubs on the reel shaft. The inclination of the leaf springs provides the possibility to thrust the hubs that are in most cases formed by cardboard sleeves onto one or more friction rings in a screw-like rotary movement. During the reeling operation the inclination in conjunction with the transmitted torque assures that the distal ends of the leaf springs are self-lockingly clawed in the inner peripheral surface of the cardboard sleeves so that tolerances in the diameters of the hubs can be compensated and each hub is reliably driven by the associated friction rings.

The friction rings should have axial dimensions as small as possible so that even narrow strips may be wound onto correspondingly narrow hubs. When the hubs have a larger width, two or more friction rings may be provided per hub.

DE 28 56 066 A1 discloses a friction ring of the type mentioned above wherein the leaf springs and the corresponding slots in the friction ring are straight.

EP 1 316 524 B1 discloses a friction ring wherein the leaf springs are replaced by drop-shaped clamping bodies that are pivotally supported in corresponding recesses of the friction ring, so that their outwardly projecting tips may be clawed into the hub. The range of pivotal movement of each clamping body is limited by the walls of the recess.

SUMMARY OF THE INVENTION

It is an object of the invention to provide a friction ring which can easily be manufactured and nevertheless assures a reliable support of the hubs and a compensation of large diameter tolerances of the hubs.

In order to achieve this object, according to the invention, each leaf spring is adapted to be bent back into a recess of the friction ring on the side facing forward in said direction of rotation and is supported on a wall of this recess on the opposite side.

Thus, when the hub is thrust-on, the leaf springs may retreat into the recesses of the friction ring so that the hub has to overcome only little resistance and, consequently, the thrust movement of the hub is facilitated. During a reeling operation, however, the leaf springs are erected such that they engage the wall of the recess. As a result, the effective length of the part of the leaf spring projecting from the friction ring is shortened, so that the leaf spring has a high bending strength and can therefore support the hub stably. In this way, a yield of the hub under varying tension of the strip being reeled or a tilting of the hub relative to the axis of rotation of the reel shaft is prevented efficiently. If, however, the internal diameter of the hub should be substantially smaller than the target value, then the leaf springs may yield, with the radially outer portions of the leaf springs being somewhat separated from the supporting wall of the recess of the friction ring.

Advantageous embodiments and further developments of the invention are indicated in the dependent claims.

In a preferred embodiment the base portions of the leaf springs and the slots of the friction ring accommodating these base portions are bent such that their radially inward end points in the direction of rotation. This permits to safely and stably fix the leaf springs in the friction ring.

Preferably, the slots that accommodate the base portions of the leaf springs have, at least in their radially outer parts, a width that is larger than then thickness of the leaf springs, so that the effective bending length of the leaf springs is increased when they are bent back into the recesses. Further inwardly, the slots may be designed such that they form a labyrinth for stably fixing the leaf spring.

In axial direction of the friction ring the leaf springs may be secured by means of support rings that flank the friction ring and the base portions of the leaf springs on at least one side.

BRIEF DESCRIPTION OF THE DRAWINGS

An embodiment example will now be explained in conjunction with the drawings, wherein.

DETAILED DESCRIPTION

Figure 1:
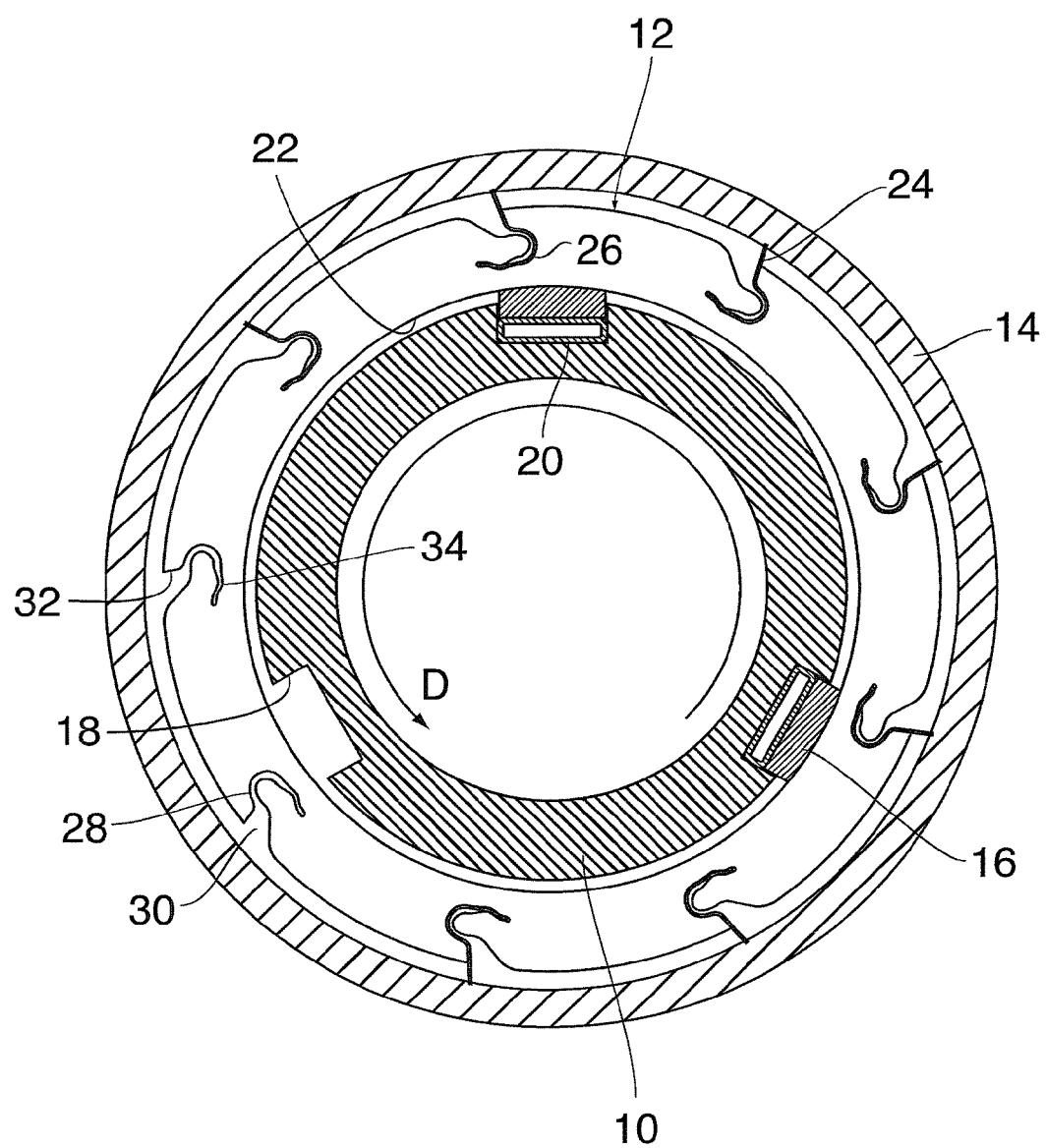
FIG. 1 is a cross-sectional view of a reel shaft having a friction ring according to the invention, and a reel hub held thereon.

In FIG. 1, a reel shaft 10 of a longitudinal cutting and reeling apparatus has been shown in cross-section. A friction ring 12, which—possibly together with additional friction rings of same design—serves for supporting one or more reel hubs 14 on the reel shaft 10, is frictionally held on the reel shaft 10 by means of friction bodies 16. Each friction body 16 is accommodated in a longitudinal groove 18 in the outer peripheral surface of the reel shaft 10. The longitudinal groove 18 further accommodates a bellows 20 that may be expanded by means of a pressure medium so that the friction body 16 is extended radially outwardly and engages a friction surface 22 at the inner periphery of the friction ring 12.

When the reel shaft 10 is driven for rotation in the direction D indicated by an arrow, the friction bodies 16 are positively entrained, and by friction with the friction surface 22 the friction bodies transmit a drive torque onto the friction ring 12 which will then entrain the hub 14 in the direction D of rotation.

At its outer periphery the friction ring 12 has a number of leaf springs 24 that project essentially radially from the periphery of the friction ring and have their distal ends clawed into the inner peripheral surface of the hub 14 that is formed by a cardboard sleeve. The radially outer portions of each leaf spring 24 are straight but are tilted relative to the radial direction in the direction D of rotation. Consequently, the torque transmitted onto the hub 14 has the tendency to pivot the leaf springs 24 in the direction opposite to the direction D of rotation, i.e. clockwise in FIG. 1, so that they are pressed even stronger, in self-locking fashion, into the inner surface of the hub 14.

At the radially inward end, each leaf spring 24 has a base portion 26 that is clampingly held in a corresponding slot 28 of the friction ring. The base portions 26 of the leaf springs and the slots 28 are curved in C-shape, with the concave side facing in the direction D of rotation.

Each of the slots 28 flares out at the radially outward end into a recess 30. The wall 32 of this recess that is trailing in the direction D of rotation extends straight and has the same inclination as the outer portion of the leaf spring 24, so that the leaf spring, when subjected to the reaction force of the hub 14, engages the wall 32 and is supported thereby.

Figure 2:
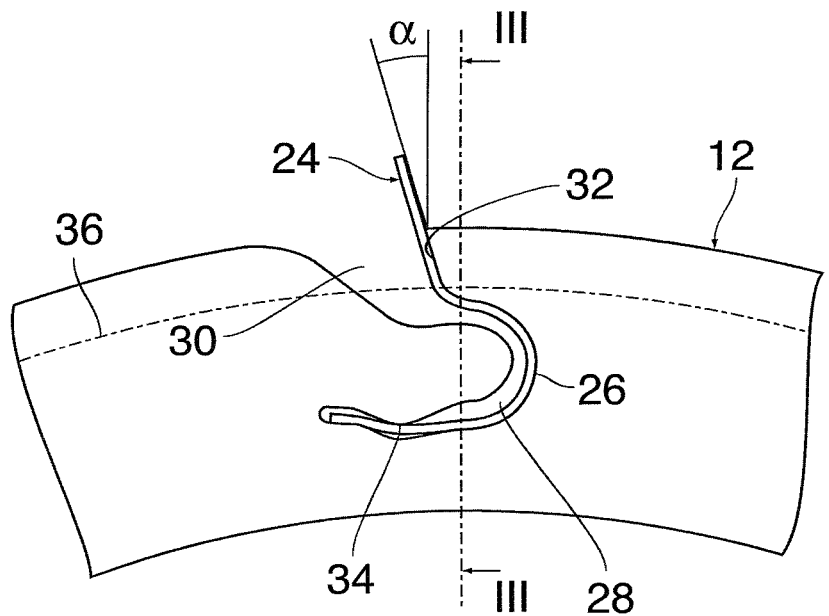
FIG. 2 shows a detail of the friction ring.

As can be seen more clearly in FIG. 2, the width of the bent slots 28 is somewhat larger than the thickness of the associated leaf spring 24, so that the leaf springs may be supported at the wall of the slot 28 with the convex side of their base portion 26 whereas the concave inner side of the base portion has a certain play within the slot 28. As a result, the base portion 26 of the leaf spring may slightly yield elastically in the direction D of rotation whereas it is stably supported in opposite direction.

The inner leg of each slot 28 forms a labyrinth 34 that enforces a slight bending of the corresponding leg of the base portion 26 of the leaf spring and assures that the leaf spring is firmly clamped in the slot 28.

When the hub 14 is to be mounted on the friction ring 12 or on a plurality of friction rings, the reel shaft 10 is held stationary and the friction ring 12 is immobilized by means of the friction bodies 16. The hub 14 is rotated relative to the friction ring 12 in the direction D of rotation and at the same time thrust axially onto the friction ring. This causes the tips of the leaf springs 24 to be deflected in the direction D of rotation, and the leaf springs are slightly bent back into the recesses 30, so that they do not substantially oppose the movement of the hub 14. When the hub has reached the intended position and the user loosens his hold, the leaf springs 24 flex back so as to stably hold the hub 14 in position. Normally, the leaf springs will then engage again the wall 32 of the recess with their straight outer portion, whereas their distal ends will somewhat dig into the cardboard of the hub 14. When, however, due to dimensional tolerances, the internal diameter of the hub 14 is somewhat too small, the leaf springs may again retreat slightly into the recesses 30 and may be bent away from the wall 32 at least in their radially outer part. On the other hand, the base portion 26 remains in engagement with the concave wall of the slot 28 so that the leaf spring 24 is still supported in stable manner.

As is shown in FIG. 2, the straight radially outer portion of the leaf spring 24 forms an acute angle a of about 16° with the radial direction. This assures that the hub 14 may be supported with high stability and will not shift relative to the friction ring 12 when it is subjected to external forces, especially tension forces of the strip of web material to be reeled. On the other hand, thanks to the play of the base portion 26 of the leaf spring in the slot 28, the leaf spring may yield relatively easily when the hub is thrust-on.

If one follows the contour of the leaf spring 28 from the radially outer end inwardly, it first makes a sharp turn in the direction opposite to the direction D of rotation at the end of the straight portion and the inner end of the wall 32. Then, it forms an arc of approximately 180° that merges into a straight leg that projects in the direction D of rotation and is clamped in the labyrinth 34.

Figure 3:
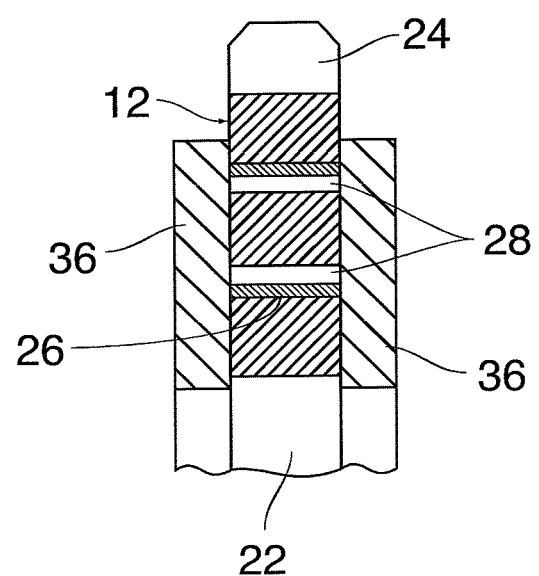
FIG. 3 is a section taken along the line in FIG. 2.

As is shown in FIG. 3, the width of the leaf spring 24 is identical with the thickness of the friction ring 12. In order to prevent the leaf spring 24 from being pressed out of the slot 28 in axial direction of the reel shaft, support rings 36 may be provided on one side or both sides of the friction ring 12 and may be fixed on the reel shaft 10 so as to support at least the base portion 26 of each leaf spring 24.

The friction ring 12 is preferably made of plastics whereas the leaf springs 24 are formed by simple strips of spring steel that are suitably bent and preferably chamfered at the end of the straight portion.

What is claimed is:

1. A friction ring for reel shafts, comprising:
   a friction surface on an inner periphery thereof for frictional engagement with the reel shaft,
   a plurality of slots and recesses in an outer periphery of the friction ring,
   a plurality of radially projecting leaf springs on the outer periphery thereof that are inclined relative to a radial direction in a uniform direction of rotation, each leaf spring having a base end portion fitted in a respective said slot of the friction ring such that opposite sides of the base end portion are engaged by walls of the slot, each leaf spring being adapted to be bent back into a respective said recess of the friction ring on a side facing forward in said direction of rotation and is supported on a wall of this recess on an opposite side thereof, and
   the slots are curved, and
   the slots have a width in a radially outward portion which opens out into the respective recess, that is larger than a thickness of the leaf springs.

2. The friction ring according to claim 1, wherein the base portions of the leaf springs are angled such that a radial inner end thereof points into said direction of rotation.

3. The friction ring according to claim 2, wherein the base portions and the slots are curved in a C-shape such that concave side faces thereof face forward in the direction of rotation.

4. The friction ring according to claim 1, wherein a radially outer part of each leaf spring and the respective wall of each recess supporting the same are straight.

5. The friction ring according to claim 4, wherein the radially outer part of the leaf spring forms an angle of less than 20° with the radial direction.

* * * * *